United States Patent [19]
Rosen et al.

[11] 3,759,980
[45] Sept. 18, 1973

[54] SALICYLATES

[75] Inventors: William E. Rosen, Summit; Philip A. Berke, Milburn, both of N.J.

[73] Assignee: Stockton Chemicals, Inc., Union, N.J.

[22] Filed: May 26, 1969

[21] Appl. No.: 827,893

[52] U.S. Cl............. 260/480, 260/474, 260/479 R, 260/479 S, 260/501.1, 260/501.15, 260/501.17, 260/567.6 M, 424/230, 424/231, 424/233

[51] Int. Cl............................................. C07c 69/86

[58] Field of Search...................... 260/474, 501.15, 260/480; 424/233

[56] References Cited
FOREIGN PATENTS OR APPLICATIONS
708,865  5/1954  Great Britain................ 260/501.15
1,076,968  7/1967  Great Britain................ 260/501.15

*Primary Examiner*—Leon Zitver
*Assistant Examiner*—Michael W. Glynn
*Attorney*—Jacobs and Jacobs

[57] ABSTRACT

A complex consisting essentially of $(R_1,R_2,R_3,R_4N^+)_n (Mg^{++})_{n^1} (ArCOO^-)_{n^2} (Ar'COO^-)_{n^3} (X^-)_{n^4} (H_2O)_{n^5}$ wherein $R_1$, $R_2$, $R_3$ and $R_4$ are selected from the group consisting of hydrogen, alkyl of one to 20 carbon atoms, hydroxyalkyl of one to 20 carbon atoms, carboxyalkyl of one to 20 carbon atoms and aralkyl of 1 to 20 carbon atoms in the alkyl moiety, Ar and Ar' are an aromatic monocycle or substituted aromatic monocycle, X is sulfate, chloride or substituted carboxylate, $n$, $n^1$ and $n^2$ are integers of at least one, and $n^3$, $n^4$ and $n^5$ are zero or an integer of at least 1, provided that when $(R_1, R_2, R_3, R_4 N^+)_n$ is choline, $(Mg^{++})_{n^1}$ is magnesium, $(ArCOO^-)_{n^2}$ is salicylate and $n^3$ is zero, $(X^-)_{n^4}$ is not sulfate, is produced by reacting a salicylate compound with a magnesium salt. The complexes produced exhibits analgesic, anti-pyretic, anti-inflammatory and anti-rheumatic acitivity. A particularly valuable compound is choline magnesium salicylate.

5 Claims, No Drawings

SALICYLATES

The present invention is concerned with salicylate compounds. The exact nature of these compounds is not fully understood and "compound" is intended to include, inter alia, compounds, complexes and compound complexes. It is clear that the salicylate compounds of the present invention are new distince entities and consist essentially of the following:

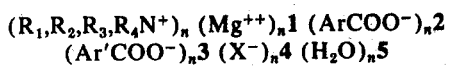

wherein $R_1$, $R_2$, $R_3$, and $R_4$ are selected from the group consisting of hydrogen, alkyl of one to 20 carbon atoms, hydroxyalkyl of 1 to 20 carbon atoms, carboxyalkyl of one to 20 carbon atoms and aralkyl of one to 20 carbon atoms in the alkyl moiety, Ar and Ar' are an aromatic monocycle or substituted aromatic monocycle, X is sulfate, chloride or substituted carboxylate, $n$, $n^1$, and $n^2$ are integers of at least one, and $n^3$, $n^4$, and $n^5$ are zero or an integer of at least 1, provided that when $(R_1, R_2, R_3, R_4 N^+)_n$ is choline, $(Mg^{++})_n 1$ is magnesium, $(ArCOO^-)_n 2$ is salicylate and $n^3$ is zero, $(X^-)_n 4$ is not sulfate. In a preferred embodiment of the present invention, $n$, $n^1$ and $n^2$ are integers from 1 to 30 and $n^3$, $n^4$, and $n^5$ are zero or integers from 1 to 30. Examples of Ar and Ar' are phenyl and phenyl substituted by hydroxyl or OCO lower alkyl especially $OCOCH_3$. In one group of compounds of the present invention $n^3$ is zero and $n$, $n^1$, $n^2$, $n^4$, and $n^5$ are integers from 1 to 30. As will be noted from the above, water may be present of absent. The salicylate compounds of the present invention are solids which can be granulated, tableted and encapsulated in contrast to such salicylates as choline salicylate and present a number of additional advantages.

Choline salicylate is well known to have desirable physiologic properties as described in the paper by Robert H. Broh-Kahn, M.D., entitled: "Symposium on Choline Salicylate," and published in the International Record of Medicine, vol. 173, No. 4, pp. 217–232, April 1960. The preparation and uses of choline salicylate have been the subject of several United States patents particularly those of Broh-Kahn et al, U.S. Pat. No. 3,069,321, and Lorz et al, U.S. Pat. No. 3,141,035, in which the preparation of solid crystalline choline salicylate has been described. The crystallization process, as described, requires the use of anhydrous organic solvents which are expensive and must be kept anhydrous. The crystallization of the final product is difficult because of the extreme hydroscopicity of the product.

Because of its deliquescence choline salicylate is extremely difficult to handle. Unless it is kept in a completely dry atomsphere, it very quickly absorbs water and becomes amorphous, sticky and finally liquid. As a result it is not feasible to maintain cholne salicylate in the solid state. It is for this reason that therapeutic doses of choline salicylate must be dispensed in liquid form usually as an aqueous solution.

It is well known that the handling and dispensing of liquid preparations is more difficult than of solids. Liquids must be bottled which is expensive and is usually accompanied by breakage and spillage. There is also the uncertainty inherent in the dispensing of a uniform dosage. A solid dry stable preparation would overcome these disadvantages especially in the administration of a uniform dose.

Various carriers for combination with choline salicylate have been proposed, but where it might be possible to maintain the choline salicylate in a dry state, it is not possible to incorporate a sufficient quantity of the choline salicylate on the carrier to give a therapeutic dose in the form of a tablet or capsule. The finished tablet or capsule of choline salicylate containing a sufficient amount of active material to fulfill its therapeutic purpose would be of such bulk or size as to make it impractical to ingest. Also many carriers are objectionable from the standpoint of cost, taste, smell, bulk, etc.

The present invention overcomes all of these objections and provides stable compounds thereby overcoming the extreme hygroscopicity of choline salicylate as well as the deliquescence which makes it extremely difficult to handle.

The present invention also overcomes the difficulties inherent in the handling and dispensing of other oily or hydroscopic salicylate or acetylsalicylate derivates by converting them into solid compounds.

The compounds of the present invention may contain water and while it has been conveniently found that from about zero to about 20 percent water is a range providing for most convenient handling of the compositions, a greater amount of water can be present if desired. In place of the water in the compounds of the present invention, a chemically equivalent solvent can be used without affecting the basic nature of the present invention.

While the working examples refer to certain ratios of components of which the present compounds consist, such terminology is used for convenience since as above indicated the compounds of the present invention are new chemical entities and the components no longer exist as separate entities.

The compounds according to the present invention are useful for their analgesic, anti-pyretic, anti-inflammatory and anti-rheumatic activity and may be administered in the same general manner and amounts as known analgesics, anti-pyretics, anti-inflammatories and anti-rheumatics such as, for example, aspirin. The compounds according to the present invention are stable, dry, non-deliquescent, generally free-flowing powders and as such can be formulated into tablets, capsules, and the like according to techniques which are per se known to those familiar with pharmaceutical techniques according to known procedures.

The compounds of the present invention may be produced by mixing an aqueous solution of a salicylate such as choline salicylate with an aqueous solution of a magnesium salt with each component being present in an amount such that the final product will have the desired concentration of salicylate. Alternatively a magnesium salt can be added as a solid to an aqueous salicylate solution and the mixture agitated until the magnesium salt is dissolved to give a homogeneous solution. In either case, the solution thus obtained may be evaporated to the degree of dryness desired and the solid obtained is powdered in a suitable mill to the desired particle size.

The solution may be evaporated to dryness in any of the known manners in vacuo at temperatures from 60°C. to 120°C. but temperatures higher than 120°C. or lower than 60°C. can be used with equal facility so long as degradation of the resulting product is avoided.

The compounds of the present invention may also be combined in the form of pharmaceutical compositions with one or more other therapeutic compounds. Any therapeutic compound with which it is desired to combine the analgesic, anti-pyretic, anti-inflammatory and anti-rheumatic activity of the compounds of the present invention may be used subject only to compatability.

The following non-limitative examples more particularly illustrate the present invention.

EXAMPLE 1

Choline salicylate with magnesium salicylate

A mixture of 17.02 g of 90% choline salicylate, 18.84 g of magnesium salicylate tetrahydrate, and 12 ml of water was warmed on the steam bath and agitated to give a clear yellow solution. Water was removed by drying at reduced pressure and elevated temperature, giving a white solid having a composition of 20–23% choline, 3–4.5% magnesium, 70–74% salicylate and 2–4% water. These assays correspond to a compound having the approximate molar proportions of 5:4:13:3, respectively. On a weight ratio basis the preferred percentages of choline:magnesium: salicylate are 1–30%: 2–15%: 60–90%.

EXAMPLE 2

Choline Salicylate with Magnesium Salicylate

In the same way as in Example 1, relative amounts of choline salicylate to magnesium salicylate ranging (on an anhydrous basis) from 60%:40% to 10%:90% (Weight:weight, respectively) were dissolved in aqueous solution and dried at reduced pressure and elevated temperature. The resulting white solid was capable of incorporating various amounts of water without appearing "wet"-looking. More vigorous drying conditions (e.g., higher temperatures, higher vacuum and/or longer drying times) gave product having lesser amounts of incorporated water.

| Weights of starting material 90% Choline Salicylate | Magnesium Salicylate Tetrahydrate | Percentage ratio of starting material weights, anhyd. Choline Salicylate: Magnesium Salicylate | Yield of complex isolated |
|---|---|---|---|
| 152.1 g | 18.84 | 90:10 | 40.5 g |
| 67.2 g | 18.84 | 80:20 | 38.0 g |
| 39.2 g | 18.84 | 70:30 | 42.0 g |

EXAMPLE 4

Choline Acetylsalicylate with Magnesium Sulfate

A solution of 21 g of oily choline acetylsalicylate and 11 g of magnesium sulfate heptahydrate in 24 ml of water was heated at reduced pressure. When the solvent was gone, 27 g of a mixture of white solid complex of choline magnesium acetylsalicylate sulfate plus excess oily choline acetylsalicylate remained; the solid complex was isolated by removal of the oil.

When the same experiment was carried out using twice as much magnesium sulfate heptahydrate (22 g), the product after drying was a solid complex of choline magnesium acetylsalicylate sulfate. Other proportions of reactants also gave solid complex products.

Choline acetylsalicylate

To 47.8 g of 75% aqueous solution of choline bicarbonate was added a total of 43.5 g of salicylic acid. After one hour of reaction at room temperature, the salicylic acid had dissolved and carbon dioxide gas had evolved. The clear yellow solution, which had a pH of 7, was taken to dryness by heating at 100°C in vacuum for 10–11 hours, leaving 69.3 g of oily choline acetylsalicylate.

EXAMPLE 5

Choline Acetylsalicylate with Magnesium Salicylate

A solution of 21 g of oily choline acetylsalicylate and 22 g of magnesium salicylate tetrahydrate in 24 ml of water was freed of solvent by heating at reduced pressure.

| Weight of starting materials | | Percentage ratio of starting material weights, anhyd. choline salicylate: magnesium salicylate | Water content of solid product, percent | | | Molar ratio | | |
|---|---|---|---|---|---|---|---|---|
| 90% choline salicylate (g.) | Magnesium salicylate tetrahydrate (g.) | | Short drying | Medium drying | Long drying | Chol. | Mg. | Salicyl. |
| 25.2 | 18.84 | 60:40 | 10.6 | 2.1 | 0.7 | 0.1 | 0.05 | 0.2 |
| 16.8 | 18.84 | 50:50 | 10.5 | 2.0 | 1.7 | 0.06 | 0.05 | 0.16 |
| 11.2 | 18.84 | 40:60 | 6.8 | 1.9 | 1.3 | 0.04 | 0.05 | 0.14 |
| 7.2 | 18.84 | 30:70 | 9.7 | 0.9 | 0.3 | 0.03 | 0.05 | 0.13 |
| 4.2 | 18.84 | 20:80 | 16.7 | 3.2 | 1.2 | 0.02 | 0.05 | 0.12 |
| 1.9 | 18.84 | 10:90 | 19.4 | 3.1 | 0.5 | 0.01 | 0.05 | 0.11 |

EXAMPLE 3

Choline Salicylate with Magnesium Salicylate

In the same way as in Example 1, relative amounts of choline salicylate to magnesium salicylate ranging (on an anhydrous basis) from 70%:30% to 90%:10% (weight:weight, respectively) were dissolved in aqueous solution and dried at reduced pressure and elevated temperature. The solid white product contained viscous yellow liquid which was removed by filtration. White solid choline magnesium salicylate complex was isolated in yields as shown in the following table.

sure. The 40 g of off-white solid product left after removal of water was a complex of choline magnesium acetylsalicylate salicylate.

Other proportions of reactants also gave solid products.

EXAMPLE 6

Trimethylammonium acetylsalicylate with Magnesium sulfate

A solution of 8.4 g of trimethylammonium acetylsalicylate, and 5.3 g of magnesium sulfate heptahydrate in 11 ml of water was prepared by swirling and gentle warming on a steam bath. Solvent was removed by drying at 100°C. and reduced pressure, leaving 9.6 g of a mixture of excess oily trimethylammonium acetylsalicylate plus white solid complex of trimethylammonium magnesium acetylsalicylate sulfate. The white solid was separated by removal of the oil.

When the same experiment was carried out using twice as much magnesium sulfate heptahydrate (10.6 g), the product after drying was a solid complex of trimethylammonium magnesium acetylsalicylate sulfate (11.4 g). Other proportions of reactants also gave solid complex products.

Trimethylammonium acetylsalicylate

A mixture of 26.6 g of 25% aqueous trimethylamine and 19.9 g of acetylsalicylic acid was stirred at room temperature for 30 minutes, giving a clear colorless solution of pH 5.6. After standing overnight, the solution was dried at 100°C in vacuum over 15 hours, leaving a clear colorless oil of trimethylammonium acetylsalicylate

EXAMPLE 7

Trimethylammonium acetylsalicylate with Magnesium salicylate

A solution of 8.4 g of trimethylammonium acetylsalicylate and 10.9 g of magnesium salicylate tetrahydrate in 11 ml of water was prepared by gentle warming on a steam bath. The clear solution was freed of solvent by heating at 100°C. at reduced pressure. The 13.9 g of white solid product was a comples of trimethylammonium magnesium acetylsalicylate salicylate. Other proportions of reactants also gave solid complex products.

EXAMPLE 8

Trimethylammonium salicylate with Magnesium sulfate

A solution of 29 g of trimethylammonium salicylate, prepared by allowing 36 g of 25% aqueous trimethylamine and 20 g of salicylic acid to react at room temperature, and 21 g of magnesium sulfate heptahydrate in 36 ml of water was prepared by warming the mixture gently on the steam bath with swirling. Water was removed at reduced pressure and heating at 100°C, leaving 43 g of a mixture of solid product which was a complex of trimethylammonium magnesium salicylate sulfate plus an oil which was excess trimethylammonium salicylate. The solid complex was isolated by removal of the oil.

When the same experiment was carried out using twice as much magnesium sulfate heptahydrate (42 g), the product after drying was a solid complex of trimethylammonium magnesium salicylate sulfate. Other proportions of reactants also gave solid compelx products.

EXAMPLE 9

Trimethylammonium salicylate with Magnesium salicylate

A solution of 29 g of trimethylammonium salicylate and 44 g of magnesium salicylate tetrahydrate in 36 ml of water was prepared by gentle warming and swirling. Removal of water by drying at 100°C. and reduced pressure left 64 g of white solid product, which was a complex of trimethylammonium magnesium salicylate. Other proportions of reactants also gave solid complex products.

EXAMPLE 10

Choline chloride with magnesium sulfate

A mixture of 12.42 g of choline chloride, 12.54 g of magnesium sulfate heptahydrate and 14.5 ml of water was warmed on the steam bath to a clear colorless solution. After standing at room temperature, fine white needles separated. Chilling resulted in the separation of more white crystalline material. The white solid was collected, washed with ice-cold water and dried at reduced pressure for one hour at 100°C. The white product was stable in air and was not hydroscopic. It contained 7.4% choline chloride, 64.5% magnesium sulfate and 28.1% water corresponding to molar proportions of approximately 1:10:30.

When the original reaction mixture was allowed to stand overnight, and water was removed at reduced pressure and at 100–110°C., 19.2 g of white solid was isolated.

EXAMPLE 11

Methyl salicylate with Magnesium salicylate

A solution of 13.56 g of methyl salicylate and 18.84 g of magnesium salicylate in 50 ml of methanol was allowed to stand at room temperature for a few hours and then the solvent was removed by heating at reduced pressure. The white pasty solid methyl salicylate-magnesium salicylate weighed 31.9 g. The white pasty solid contained the equivalent molar ratios of methyl salicylate-magnesium salicylate and water of about 2–4:2:1.

EXAMPLE 12

Methyl salicylate with Magnesium sulfate

A mixture of 13.56 g of methyl salicylate, 12.54 g of magnesium sulfate heptahydrate and 100 ml of methanol was heated on the steam bath. After standing at room temperature, the white solid precipitation was collected and dried, giving 7.2 g of white solid complex, containing the equivalent of approximately 1:7:4 molar proportions of methyl salicylate, magnesium sulfate and solvent, respectively.

EXAMPLE 13

Choline chloride with Magnesium salicylate

A mixture of 16.6 g of 75% aqueous choline chloride solution, 25.8 g of magnesium salicylate tetrahydrate, and 30 ml of water was gently warmed on the steam bath and swirled to a clear colorless solution. Drying at 100–120°C. at reduced pressure for 5 hours left 36.9 g of white solid, of choline magnesium chloride salicylate.

What is claimed is:

1. A non-deliquescent solid composition of matter selected from the group consisting of (1) a complex consisting essentially of the magnesium cation, choline cation and at least one anion selected from the group consisting of the salicylic acid anion and the acetylsalicylic acid anion, the molar ratio of magnesium cation to choline cation being from about 1:2 to about 5:1 and the molar content of said anion being equal to the sum of the molar content of choline plus twice the molar content of magnesium and (2) hydrates of said complex.

2. A composition of matter according to claim 1 wherein the anion is the salicylic acid anion.

3. A composition of matter according to claim 1 wherein the anion is the acetylsalicylic acid anion.

4. A composition of matter according to claim 1 wherein both the salicylic acid anion and the acetylsalicylic acid anion are present.

5. A composition of matter consisting of magnesium cations, choline cations, and salicylic acid anions which in its hydrated form has a molar ratio of magnesium:choline:salicylic acid:water of 4:5:13:3.

* * * * *